United States Patent
Montague

(10) Patent No.: US 7,209,730 B2
(45) Date of Patent: *Apr. 24, 2007

(54) TELEPHONE ADAPTED FOR EMERGENCY DIALING BY TOUCH

(75) Inventor: William A. Montague, Concord, MA (US)

(73) Assignee: Safer Home, Inc., Concord, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/218,005

(22) Filed: Sep. 1, 2005

(65) Prior Publication Data

US 2006/0029208 A1    Feb. 9, 2006

Related U.S. Application Data

(63) Continuation-in-part of application No. 10/005,585, filed on Oct. 26, 2001, now Pat. No. 6,941,125.

(51) Int. Cl.
    *H04M 11/04*    (2006.01)
(52) U.S. Cl. ............... 455/404.1; 455/521; 455/550.1; 379/433.06; 379/367; 379/368; 434/227; 434/228
(58) Field of Classification Search ............ 455/404.1, 455/521, 550.1, 564, 565; 379/367, 368, 379/433.06; D14/137–155, 244; 434/169, 434/227–228
See application file for complete search history.

(56) References Cited

U.S. PATENT DOCUMENTS

| | | | |
|---|---|---|---|
| 2,754,370 A | | 7/1956 | Gauvreau |
| 4,119,809 A | * | 10/1978 | Bianchini .................. 379/367 |
| 4,755,072 A | * | 7/1988 | Hoornweg ................. 400/490 |
| 4,866,764 A | | 9/1989 | Baker, III |
| 4,909,739 A | | 3/1990 | Ladner et al. |
| 5,314,337 A | | 5/1994 | Dixon |
| 5,320,511 A | * | 6/1994 | Woerner .................... 425/130 |
| 5,365,570 A | | 11/1994 | Doubelik |
| 5,444,775 A | * | 8/1995 | Tobish ....................... 379/368 |
| 5,700,097 A | | 12/1997 | Kuhlenschmidt |
| 5,701,123 A | | 12/1997 | Samuelewicz |
| 5,813,861 A | | 9/1998 | Wood |

(Continued)

FOREIGN PATENT DOCUMENTS

WO    WO-9627256    9/1996

*Primary Examiner*—Steve M. D'Agosta
(74) *Attorney, Agent, or Firm*—Francis J. Caufield

(57) ABSTRACT

A telephone has a key pad with ten number keys arranged to dial the digits from 0 to 9 inclusive, each of these number keys being marked with a visual indicator denoting the digit which the number key is arranged to dial. The 1 and 9 number keys are provided with tactile indicators, distinguishable from one another by touch, so that a user can dial 911 by touch under conditions, such as in thick smoke or during a power failure, when the visual indicators on the keys are not readily distinguishable. The tactile indicators do not substantially obscure the visual indicators on the keys bearing the tactile indicators. An existing telephone may be retrofitted with the tactile indicators by providing two auxiliary members which can be secured to the 1 and 9 number keys, preferably with adhesive. Additional tactile indicators distinguishable by touch may be provided on other keys needed to dial 911 on cordless or cellular telephones, such as the on and send keys on such telephones.

6 Claims, 5 Drawing Sheets

U.S. PATENT DOCUMENTS

| | | |
|---|---|---|
| 5,898,774 A * | 4/1999 | Shindo .................. 379/433.13 |
| 5,995,847 A | 11/1999 | Gergen |
| 6,212,271 B1 | 4/2001 | Hughes et al. |
| 6,419,494 B1 * | 7/2002 | Theismann et al. ......... 434/227 |
| 6,752,631 B2 | 6/2004 | Schwarzkopf |
| 6,850,225 B1 | 2/2005 | Whitcroft |
| 2002/0196934 A1 | 12/2002 | Kunimune |

* cited by examiner

TELEPHONE ADAPTED FOR EMERGENCY DIALING BY TOUCH

REFERENCE TO RELATED APPLICATIONS

This application is a continuation-in-part of U.S. patent application Ser. No. 10/005,585 now U.S. Pat. No. 6,941,125 filed Oct. 26, 2001 in the name of William A. Montague with the title "TELEPHONE ADAPTED FOR EMERGENCY DIALING BY TOUCH", the entire contents of which is incorporated herein by reference.

BACKGROUND OF THE INVENTION

This invention generally relates to a telephone adapted for dialing by touch. More specifically, this invention relates to a telephone having a key pad in which certain keys have been modified to facilitate the dialing of emergency calls by touch.

In almost all parts of the United States of America, emergency services can be summoned by dialing "911" from any telephone. In many areas, so-called "enhanced 911" systems are deployed. In such systems, the emergency operator, on receiving a 911 call from a telephone in a fixed location, is immediately advised of the address from which the call is being made, so that emergency personnel can be dispatched to the proper location even if the person making the call is unable to speak to the operator.

It may thus be a matter of life and death for a person in an emergency situation to be able to dial 911 without delay. However, it is obvious that many emergency situations make dialing a telephone difficult. A person alone and taken ill during the night may be able to find a telephone but may have difficulty locating his or her spectacles or contact lenses. In some emergencies, especially fires, electric power may be cut off, resulting in no or inadequate lighting for a user to see keys on a telephone, or a room may become filled with smoke, with similar results. Under such difficult conditions, a panicked or fearful person can easily pick up the handset of a cordless telephone, or a cellular telephone, upside down, and press the wrong keys, thus either failing to dial any number whatsoever, or a number which will not connect to the emergency operator.

To avoid these problems, it is desirable that telephones provide some way in which 911 can be dialed by touch, without the need for the user to see the key pad. Attempts have, of course, long been made to modify telephones to enable them to be used by the blind or visually impaired; see, for example, U.S. Pat. Nos. 2,754,370 and 4,119,809, both of which describe methods for modifying the dials of rotary dial telephones so as to place the Braille equivalents of the digits 0 and 1 to 9 adjacent to the relevant finger holes in the dial, so enabling the telephone to be dialed by a blind person. Obviously, a telephone with a key pad could be modified in the same manner by placing the Braille equivalents of the digits on or adjacent the relevant keys. However, such a Braille-modified key pad is emphatically not what a typical sighted user needs in an emergency situation. Braille is only known by about 10 per cent of visually impaired in the United States, and is almost unknown among the sighted. A sighted user, confronted in an emergency situation by a telephone key pad in which every key bears a different "tactile indicator", all of which are incomprehensible to the user, is likely to be more delayed that if the key pad bore no tactile indicators whatsoever.

U.S. Pat. No. 5,444,775 describes a telephone with a key pad which has been modified by mounting "locator aids" on the telephone itself, these locator aids each being in the form of a hinged plastic strip having an aperture arranged to lie adjacent a selected key; two such locator aids enable the 1 and 9 keys to be identified by touch. The locator aids appear likely to be a substantial nuisance during normal use of the telephone and are susceptible to mechanical damage, especially when employed on cellular or cordless telephones.

It is of course well known to provide telephone key pads with keys in addition to the normal 0, 1–9, * and # keys; for example, many telephones are equipped with speed-dialing keys for dialing pre-programmed numbers (see, for example U.S. Pat. No. 6,212,271), and many office telephones are provided with "Hold" and "Transfer" keys. It has been suggested that a "911" key be provided on a telephone so that this emergency number could be dialed with a single key press; see, for example, U.S. Pat. Nos. 4,866,764 and 5,365,570. However, there is no agreement as to the size and placement of the 911 key relative to the other keys of a regular key pad, so that a guest in a residence or hotel would not know how to find the 911 key by touch, and indeed a homeowner who has several telephones from various manufacturers scattered around his or her house might have difficulty in an emergency remembering where the 911 key is on any particular telephone.

Furthermore, telephones provided with single key press 911 dialing tend to generate a disproportionate number of false alarms. Young children may play with a telephone, or an adult might inadvertently touch the 911 key while reaching for one of the other keys. Although it might be thought that such false alarms could readily be disposed of by the emergency operator talking to the telephone user, a child might not be able to explain the situation, and in any case laws or regulations in many communities require that once a 911 call has been made, police must be dispatched to check the location from which the call is made, in order to ensure that, for example, a person making a 911 call and then denying a need for assistance is not the victim of a hostage situation, domestic violence or a similar situation involving coercion.

It has also been suggested telephones be able to dial 911 by voice activation. However, voice activated systems are notoriously unreliable, especially when they are required to cope with numerous different users, background noise etc., and such difficulties are exacerbated in emergency situations, where people are unlikely to be speaking in the calm, clear voice for which most voice activated systems are designed. Furthermore, in some emergency situations, as for example when a homeowner suspects that a burglar is inside his house and wishes to summon police, voice activation is especially inappropriate.

For the foregoing reasons, none of the prior art proposals for facilitating dialing of 911 in emergencies is satisfactory, and a solution is required which meets as many as possible of the following criteria:

(a) the solution should enable a user to distinguish the 1 and 9 keys by touch from the other keys on the key pad, and from each other;

(b) the solution should not clutter the other number keys on the key pad with tactile indicators which are likely to confuse a user;

(c) the solution should allow for tactile recognition of all keys (for example, the "on" and "send" keys on a cellular telephone) which may be required to dial a 911 call;

(d) the solution should not hinder normal use of the telephone;

(e) the solution should be readily applicable to telephones varying size and shape;

(f) the solution should if possible permit retrofitting of existing telephones; and (g) the solution should be inexpensive.

It is a primary object of the present invention to provide a solution which can meet all of the foregoing criteria.

It is another object of the present invention to provide a method by which an existing telephone can be modified in a simple and inexpensive manner to enable the 1 and 9 keys, and optionally any other keys required to make an emergency call, to be distinguished by touch.

Other objects of the invention and will in part appear hereinafter and will in part be obvious when the following detailed description is read in connection with the drawings.

SUMMARY OF THE INVENTION

In general, in one aspect, the invention provides a telephone having a key pad comprising at least ten number keys arranged to dial the digits from 0 to 9 inclusive, each of these number keys being marked with a visual indicator denoting the digit which the number key is arranged to dial. The number key arranged to dial the digit 1 comprising a first tactile indicator directly affixed thereto, and the number key arranged to dial the digit 9 comprising a second tactile indicator directly affixed thereto and distinguishable by touch from the first tactile indicator. The first and second tactile indicators do not substantially obscure the visual indicators on the number keys bearing the tactile indicators.

In general, in another aspect, the invention provides a method of modifying a telephone to enable an operator of the telephone to dial "911" by touch, The method comprises:

providing a telephone having a key pad comprising at least ten number keys arranged to dial the digits from 0 to 9 inclusive, each of these number keys being marked with a visual indicator denoting the digit which the number key is arranged to dial;

providing a first auxiliary member comprising a first tactile indicator;

providing a second auxiliary member comprising a second tactile indicator distinguishable by touch from the first tactile indicator, attaching the first auxiliary member to the number key arranged to dial the digit 1 such that the first tactile indicator does not substantially obscure the visual indicator on the number key; and attaching the second auxiliary member to the number key arranged to dial the digit 9 such that the second tactile indicator does not substantially obscure the visual indicator on the number key.

Other advantages and features of the invention will become apparent from the following description, and from the claims.

BRIEF DESCRIPTION OF THE DRAWINGS

The structure, operation, and methodology of the invention, together with other objects and advantages thereof, may best be understood by reading the detailed description in connection with the drawings in which unique reference numerals have been used throughout for each part or feature and wherein.

DETAILED DESCRIPTION OF THE INVENTION

As already mentioned, the present invention provides a modified telephone having a key pad comprising at least ten number keys each arranged to dial one of the digits from 0 to 9 inclusive and marked with a visual indictor denoting the digit which the key is arranged to dial. To facilitate dialing 911 calls, the number 1 key (i.e., the key arranged to dial the digit 1) bears a first tactile indicator, while the number 9 key bears a second tactile indicator distinguishable by touch from the first tactile indicator. The first and second tactile indicators are preferably arranged so that they do not substantially obscure the visual indicators on the keys on which they are carried; by "not substantially obscure" is meant that the visual indicators remain readable by a normal observer, although some distortion or obstruction of the visual indicator may occur when the key pad is viewed at certain angles. Preferably the tactile indicators are non-Braille equivalents.

Many telephones, for example cordless and cellular telephones, have, in addition to the number keys, an "on" or "power" key which must be pressed before the number keys can dial their associated digits. In such telephones, it is desirable to provide the on or power key with a third tactile indicator distinguishable by touch from both the first and second tactile indicators, so that a user can readily locate the on or power key by touch when making an emergency call. Similarly, most cellular telephones have a "send" key which must be pressed after pressing the number keys in order to transmit the numbers dialed by the number keys, and in such telephones it is desirable to provide the send key with a fourth tactile indicator distinguishable by touch from all of the first, second and third tactile indicators, so that a user can readily locate the send key by touch when making an emergency call.

Figures 1, 2:
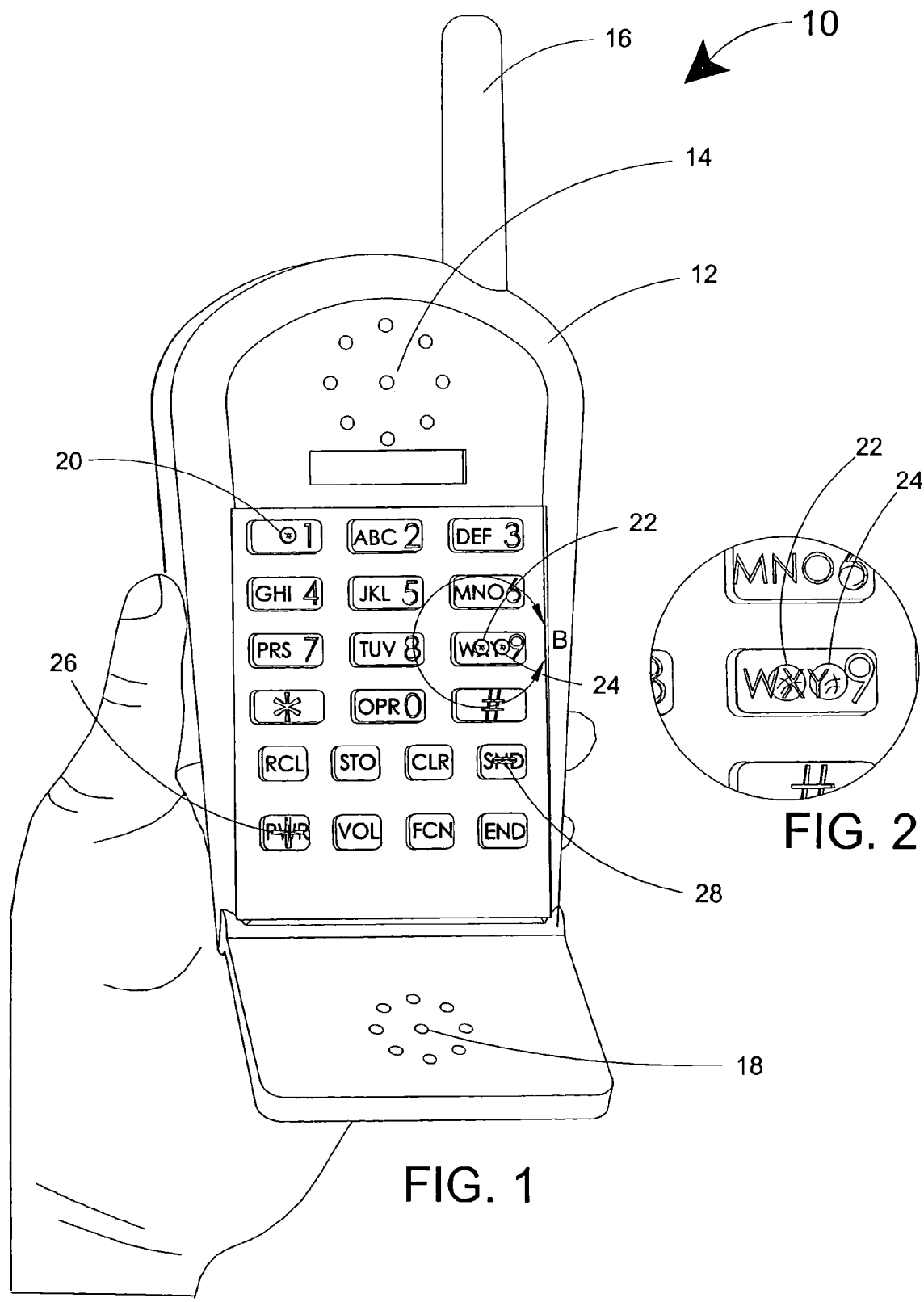
FIG. 1 is a diagrammatic perspective view of a cellular telephone of the present invention.
FIG. 2 is an enlarged diagrammatic view of the portion of the cellular telephone shown in FIG. 1 lying within circle "B" in that Figure.

FIG. 1 of the accompanying drawings is a diagrammatic perspective view, taken from in front and to one side, of a cellular telephone (generally designated 10) of the present invention. The telephone 10 comprises a body 12 comprising an ear piece 14 and carrying an antenna 16. A mouth piece section 18 is hingedly mounted on one end of the body 12, and it is shown in FIG. 1 in the "deployed" position it occupies when the telephone is in use.

The body 12 is further provided with a key pad comprising:

(a) ten number keys arranged in the conventional 3-3-3-1 arrangement and arranged to dial the digits 0 to 9 inclusive (for convenience these number keys will hereinafter be referred to "the 1 key", etc.), each of these keys being marked with the digit which it is arranged to dial and, except for the 1 key, with letters in the conventional arrangement;

(b) a * key and a # key disposed on either side of the 0 key; and (c) two rows of four keys each devoted to cellular telephone functions, namely (taken in order from top to bottom and left to right) a recall key marked "RCL", a number storage key marked "STO", a clear key marked "CLR", a send key marked "SND", a power or on key marked "PWR", a volume key marked "VOL", a function key marked "FCN" and a call termination key marked "END".

All the features of the telephone 10 previously described are conventional. However, in accordance with the present invention, the 1, 9, send and power keys are all modified so that they can be located and distinguished by touch to enable a user to dial an emergency call without having to see the key pad. The 1 key bears a first tactile indicator in the form of a centrally-located substantially hemispherical projection 20. The 9 key bears a second tactile indicator in the form two spaced substantially hemispherical projections 22 and 24, best seen in FIG. 2. The power key bears a third tactile indicator in the form of a cruciform projection 26. Finally, the send key bears a fourth tactile indicator in the form of an elongate ridge-like projection 28.

The tactile features of the inventive telephone keypad are preferably provided by molding them into the specially configured emergency, power, and/or send keys at the time of their fabrication.

Figure 3:
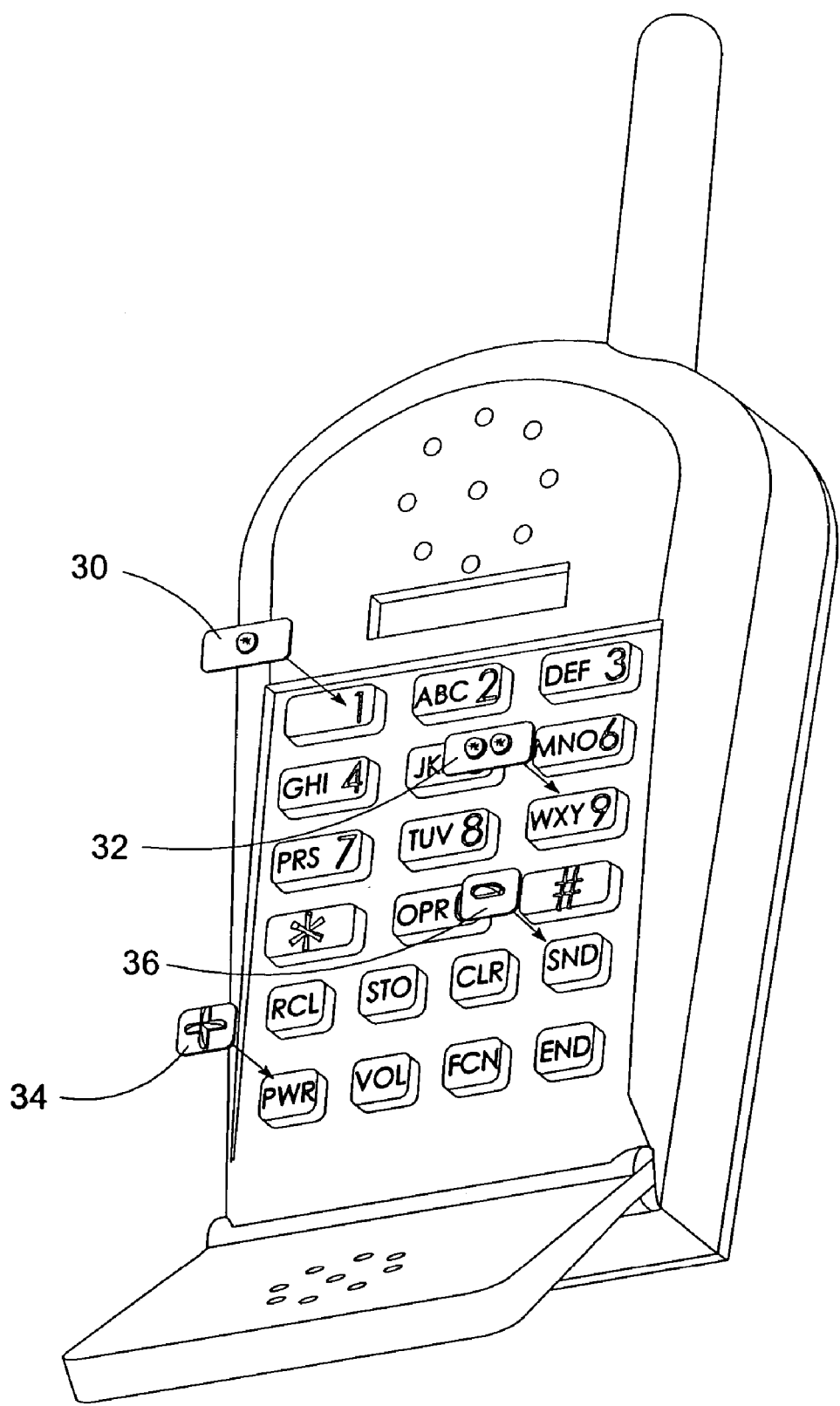
FIG. 3 is an exploded diagrammatic view showing the manner in which an existing cellular telephone may be modified to produce the cellular telephone shown in FIGS. 1 and 2.

FIG. 3 illustrates a method by which a conventional cellular telephone may be modified to produce the telephone 10 of the present invention shown in FIGS. 1 and 2 or more generally to retrofit the existing base of installed telephones. Essentially, the modification is effected by securing to the 1, 9, power and send keys respectively first, second, third and fourth auxiliary members 30, 32, 34 and 36, respectively. As most easily seen from FIGS. 4–7, which show enlarged views of the four auxiliary members 30, 32, 34 and 36, each auxiliary member comprises a substantially rectangular thin base plate 38 bearing on one of its major surfaces the required projection(s) 20, 22/24, 26 or 28, and on its opposed major surface an adhesive layer 40, which is preferably a pressure-sensitive adhesive so that the auxiliary member can be secured to a key of the telephone 10 simply by finger pressure. (Although not shown in FIGS. 4–7, the auxiliary members would typically be supplied with a protective peelable layer covering the adhesive layer 40, this peelable layer being removed immediately before the auxiliary members are applied to the keys of the telephone.) The base plates 38 and the projections of the auxiliary members 30, 32, 34 and 36 are formed as a single integer from a transparent material, preferably a plastic such as poly(methyl methacrylate), so that, after the auxiliary members have been secured to the relevant keys of the telephone 10, neither the base plates 38 nor the associated projections 20, 22/24, 26 or 28 will significantly obscure the markings (visual indicators) on the underlying keys, although of course the projections may introduce some minor but tolerable distortion of the markings when the telephone is viewed at certain angles.

Figure 4:
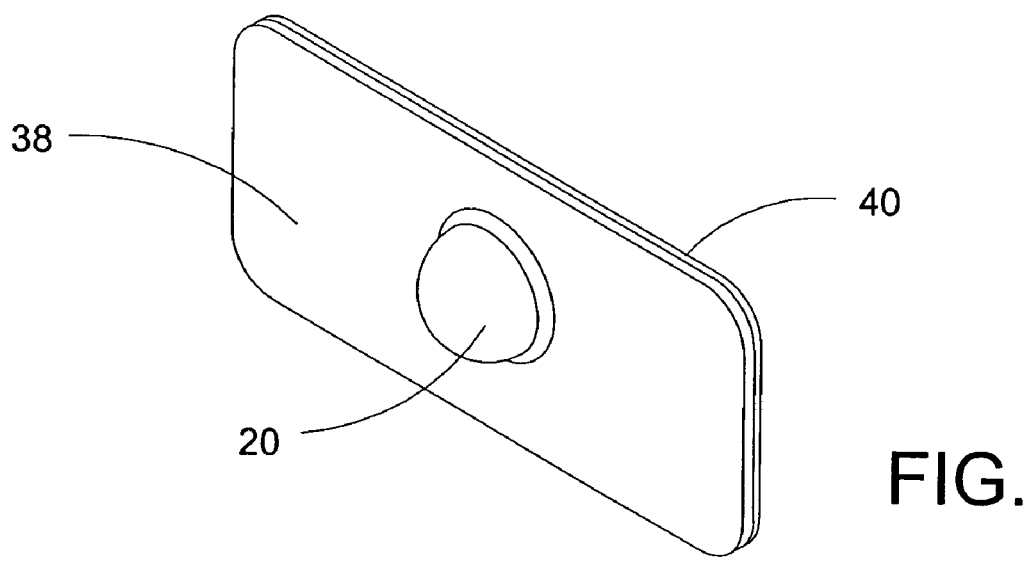
FIGS. 4–7 are diagrammatic perspective views of the four auxiliary members shown in FIG. 3.
Figure 5:
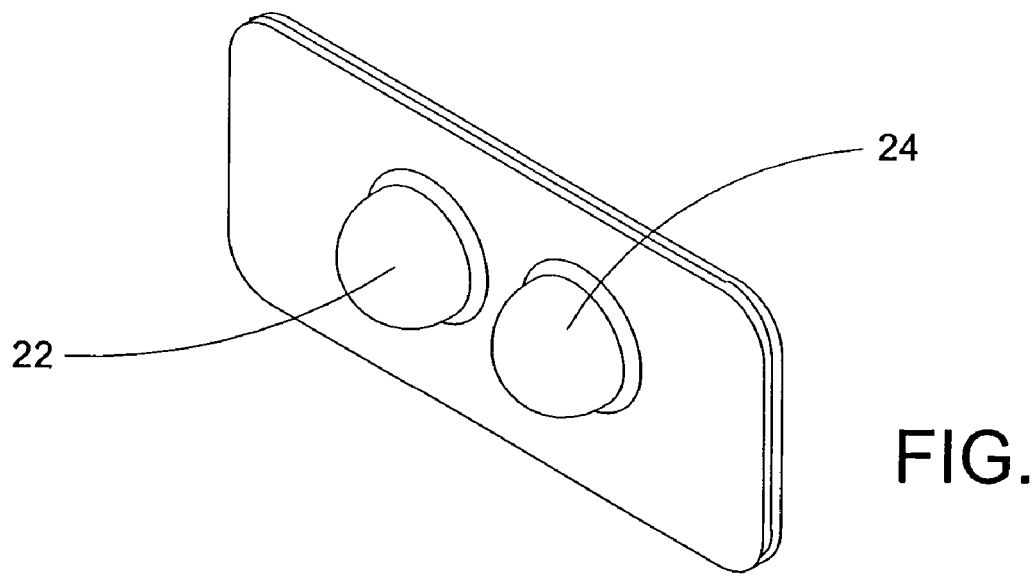
Figure 6:
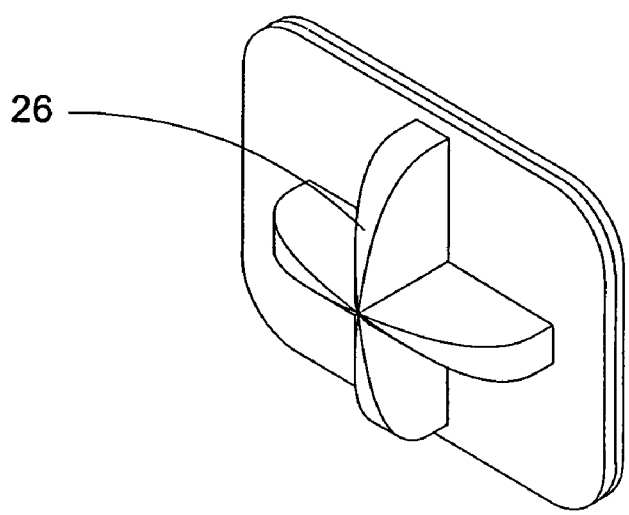
Figure 7:
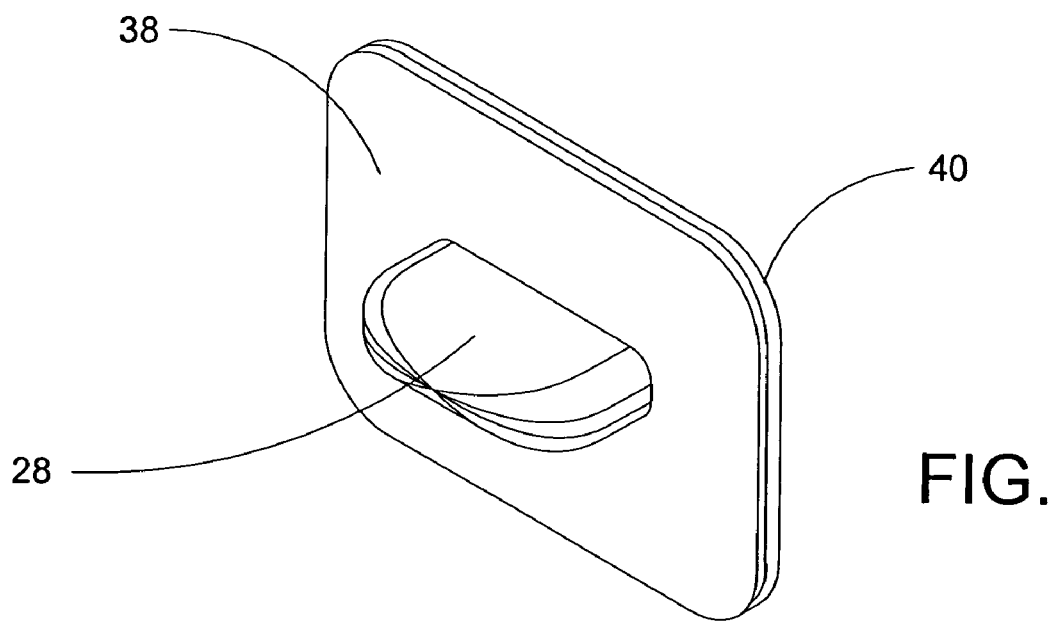
Figure 8:
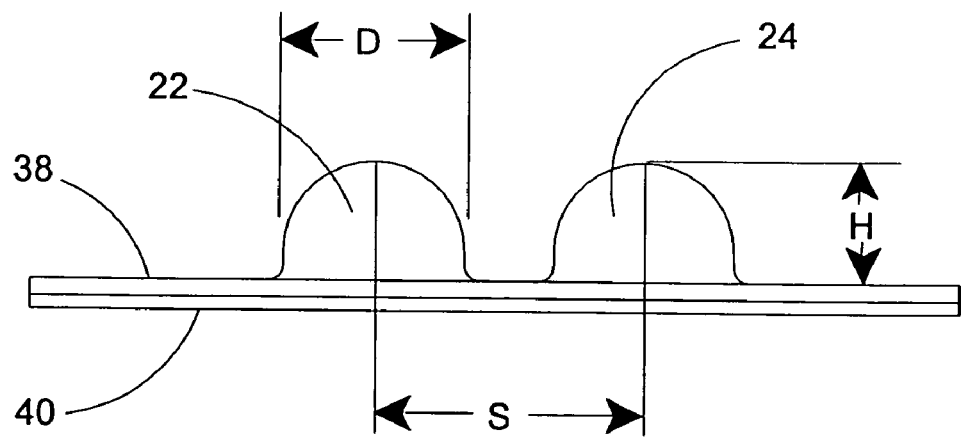
FIG. 8 is an end elevation of the second auxiliary member shown in FIG. 5 and illustrates the presently preferred dimensions of the projections of this auxiliary member.

It has been found that the dimensions of the substantially hemispherical projections, and the spacing between the projections 22 and 24, should be carefully controlled to enable users to distinguish the 1 and 9 keys by touch. As shown in FIGS. 4, 5 and 8, each of the projections 20, 22 and 24 is substantially preferably hemispherical with the flat surface of the hemisphere adjacent the base plate 38 to as to face the number key on which the projection is mounted once the base plate 38 has been secured to this number key. In fact, to prevent accumulation of dirt around the base of the hemispherical projection and for ease of molding, each hemispherical projection flares adjacent the base plate 38 so that there is smooth transition from the surface of the projection to the flat surface of the base plate. To enable the hemispherical projections to be located and distinguished readily by sighted persons, it has been found desirable to make the hemispherical projections somewhat larger than the projections normally used in Braille; preferably, each hemispherical projection has a diameter (D in FIG. 8) in the range of about 0.062 to about 0.125 inch (about 1.6 to about 3.2 mm) and a height (H) in the range of about 0.032 to about 0.062 inch (about 0.80 to about 1.6 mm). In the case of the second auxiliary member 32 having a pair of spaced, substantially hemispherical projections, the spacing (S in FIG. 8) between the centers of the two projections is preferably in the range of about 0.093 to about 0.375 inch (about 2.4 to about 9.5 mm) or small enough to be encompassed by the touch of users with the smallest anticipated finger pad.

Figure 9:
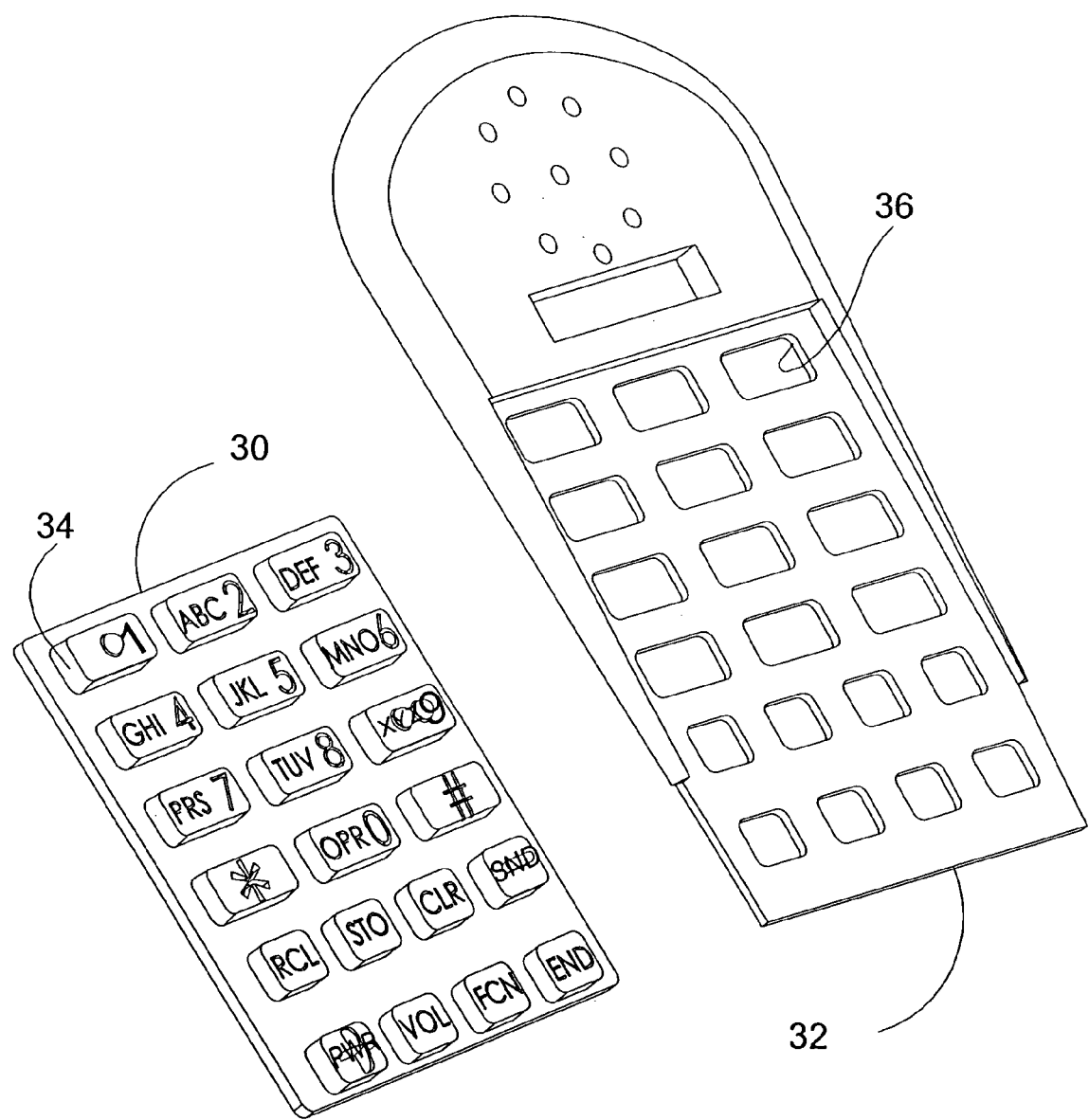
FIG. 9 is a diagrammtic exploded perspective of an alternate embodiment of the invention.

Reference is now made to FIG. 9 which shows in exploded diagrammatic fashion an alternate embodiment for providing the emergency touch dialing features of the invention. Shown there are a single piece keypad 30 and a complementary configured telephone cover 32 that typically is adapted to be snap fitted to the body of a telephone. The keypad 30 is preferably molded of a non-conducting flexible material, such a silicon elastomer, having raised key pedestals 34 (typical) that carry the usual key indicia, and in the case of the invention, the touch indicators previously described for the 1, 9, power, and send keys. Key pedstals 34 fit into corresponding apertures 36 (also typical), both of which structures are dimensioned to provide access to the keys and permit them to be pressed to close underlying electronic switching (not shown) but commonly used in commercially available telephones.

From the foregoing, it will be seen that the embodiments of the present invention illustrated in the drawings provides an inexpensive means for retrofitting an existing cellular telephone to enable the user to recognize by touch all the keys needed to make an emergency call, without cluttering the other keys on the key pad with confusing tactile indicators. The tactile indicators do not hinder normal use of the telephone and are not highly susceptible to damage during normal handling and use of a cellular telephone. Finally, a single set of the auxiliary members can be used with telephones of varying shape and size, since it does not greatly matter if the base plates of the auxiliary members are somewhat smaller than the keys on which they are mounted.

While the invention has been described with reference to particular embodiments thereof, those skilled in the art will be able to make various modifications to the described embodiments of the invention without departing from its true spirit and scope. For example, the Braille equivalents for the numerals 9 and 1 may be used in place of the non-Braille equivalents described herein. In addition, the base plates of the invention may be affixed by a suitable adhesive that is preferably transparent upon curing, and the geometry of the base pads may be provided in various shapes and sizes to accommodate those of the existing installed telephones. For example, the base plate 38 and its associated adhesive layer 40 could be replaced with an adhesive tape. Also, although the invention has been shown in the drawings in a manner which permits an existing cellular telephone to be retrofitted with the tactile indicators of the invention, the tactile indicators could be provided on the relevant keys during manufacture of the telephone. In such cases, the tactile indicators could be attached to keys by techniques other than the use of adhesive; for example, the indicators could be heat welded to the keys, or transparent plastic resin could be molded on top of the keys, in both cases normally before the keys are assembled into a finished telephone. Not all telephones will need the four tactile indicators shown in the drawings; cordless telephones do not have a send key and will not require the fourth tactile indicator, while telephones permanently connected to a land line will not require either the third or fourth tactile indicators.

For all the foregoing reasons, the whole of the foregoing description is to be interpreted in an illustrative and not in a limitative sense, the invention being defined solely by the appended claims.

I claim:

1. A method of modifying a telephone to enable an operator of said telephone to dial "911" purely by touch, said method comprising:
   providing a telephone having a key pad comprising at least ten number keys arranged to dial the digits from 0 to 9 inclusive, each of said number keys being marked with a visual indicator denoting the digit which the number key is arranged to dial;
   providing a first auxiliary member having a first tactile indicator, said first auxiliary member comprising a substantially rectangular transparent thin base having tactile projections on one of its major surfaces to provide said first tactile indicator and an adhesive layer on its other major surface opposing said one major surface;
   providing a second auxiliary member comprising a second tactile indicator distinguishable by touch from the first tactile indicator, said second auxiliary member comprising a substantially rectangular transparent thin base having tactile projections on one of its major surfaces to provide said second tactile indicator and an adhesive layer on its other major surface opposing said one major surface;
   adhering the first auxiliary member to the number key arranged to dial the digit 1 such that the first tactile indicator does not substantially obscure the visual indicator on said number key; and
   adhering the second auxiliary member to the number key arranged to dial the digit 9 such that the second tactile indicator does not substantially obscure the visual indicator on said number key.

2. A method according to claim 1 wherein said telephone has, in addition to said ten number keys, an on key which must be pressed before said number keys can dial their associated digits, and wherein said method comprises providing a third auxiliary member comprising a third tactile indicator distinguishable by touch from both said first and second tactile indicators, and attaching said third auxiliary member to said on key.

3. A method according to claim 2 wherein said telephone has, in addition to said ten number keys and said on key, a send key which must be pressed after pressing said number keys in order to transmit the digits dialed by said number keys, said method comprising providing a fourth auxiliary member comprising a fourth tactile indicator distinguishable by touch from all of said first, second and third tactile indicators, and wherein said method comprising attaching said fourth auxiliary member to said send key.

4. Telephone keypad tactile add-ons for modifying a telephone to enable an operator of said telephone to dial "911" purely by touch where the telephone has a key pad comprising at least ten number keys arranged to dial the digits from 0 to 9 inclusive, each of said number keys being marked with a visual indicator denoting the digit which the number key is arranged to dial, said add-ons comprising:
   a first auxiliary member comprising a first tactile indicator, said first auxiliary member comprising a substantially rectangular transparent thin base having tactile projections on one of its major surfaces to provide said first tactile indicator and an adhesive layer on its other major surface opposing said one major surface; and
   a second auxiliary member comprising a second tactile indicator distinguishable by touch from the first tactile indicator, said second auxiliary member comprising a substantially rectangular transparent thin base having tactile projections on one of its major surfaces to provide said second tactile indicator and an adhesive layer on its other major surface opposing said one major surface,
   said first and second auxiliary members being adapted to be attached to the number key arranged to dial the digit 1 such that the first tactile indicator does not substantially obscure the visual indicator on said number key and said second auxiliary member to the number key arranged to dial the digit 9 such that the second tactile indicator does not substantially obscure the visual indicator on said number key.

5. The add-ons according to claim 4 wherein said telephone has, in addition to said ten number keys, an on key which must be pressed before said number keys can dial their associated digits, and wherein said add-ons comprise a third auxiliary member comprising a third tactile indicator distinguishable by touch from both said first and second tactile indicators, and said third auxiliary member being adapted to be attached to said on key.

6. The add-ons according to claim 5 wherein said telephone has, in addition to said ten number keys and said on key, a send key which must be pressed after pressing said number keys in order to transmit the digits dialed by said number keys, said add-ons comprising a fourth auxiliary member comprising a fourth tactile indicator distinguishable by touch from all of said first, second and third tactile indicators, and wherein said fourth auxiliary member is adapted to be attached to said fourth auxiliary member to said send key.

* * * * *